3,041,521
CIRCUIT ARRANGEMENT FOR AUTOMATICALLY CHARGING A STORAGE CELL

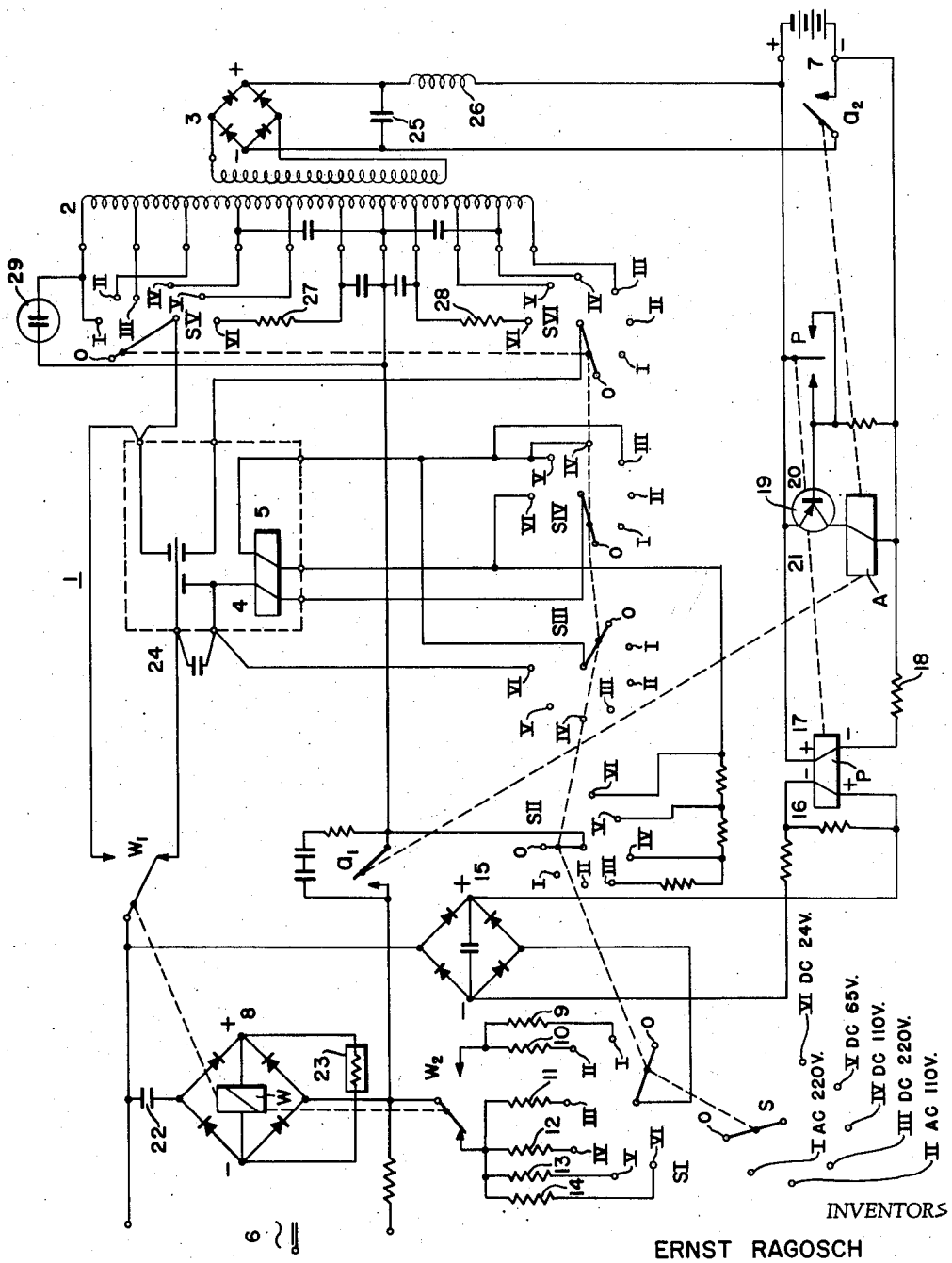
INVENTORS
ERNST RAGOSCH
HORST GERKE

Ernst Ragosch, Hamburg, and Horst Gerke, Hamburg-Eidelstedt, Germany, assignors to North American Philips Company, Inc., New York, N.Y., a corporation of Delaware
Filed July 14, 1958, Ser. No. 748,331
Claims priority, application Germany Aug. 22, 1957
3 Claims. (Cl. 320—28)

The present invention relates to a buffer charging circuit arrangement for charging a storage cell. More particularly, the invention relates to a circuit arrangement for charging a storage cell with any of a plurality of given operational voltages.

With movable measuring devices or communication systems there is a need for the battery feeding the system, frequently an accumulator, to be charged at any instant and to be used, as the case may be, only as a buffer, when local line voltages are available for the movable system. The local line voltages may be a direct voltage, an alternating voltage or even a voltage aboard ship. These voltages deviate from the conventional 220 or 110 v. and may be, for example 65 v. or 24 v. direct voltage.

In accordance with the present invention, a comparison voltage between a voltage derived from the line voltage and the storage cell or battery voltage controls a transistor-controlled relay. The contacts of the relay are closed only if the comparison voltage is sufficiently low. The supply of the line voltage is chosen by means of a switch to a transformer and the charging voltage is provided by the transformer.

With respect to known charging arrangements, the buffer charging arrangement of the present invention has the advantage that the charging voltage or the line voltage need not be known, while operation always automatically takes place with the correct voltage.

The invention will be described more fully with reference to the drawing, which shows diagramatically in the FIGURE 1 embodiment. In order to utilise direct voltages and alternating voltages, a vibrator system is provided, which comprises a vibrator 1, a transformer 2 and the charging rectifier 3 proper. The driving coils 4 and 5 of the vibrator are connected in parallel or in series in accordance with the line voltage, as will be explained hereinafter in greater detail. Thus a high heating is avoided at a high direct voltage. A control-switch S is provided with a rotatable arm, which may, for example, be manually operated, and functions as a selector switch having sufficient multiple switching positions to correspond to the number of types and values of line voltages with which the circuit arrangement of the invention is contemplated to cooperate. In the particular embodiment chosen to illustrate the principles of this invention, control-switch S for the line voltage has six switching positions I ... VI, which correspond to the following values and types of line voltage utilized therein; to wit, 220 A.C., 110 A.C., 220 D.C., 110 D.C., 65 D.C., and 24 D.C. volts, respectively. A seventh position, or "off" position O, corresponding to zero line voltage, is also provided for switch S. In addition to switch S, six other switches SI to SVI, having various switching functions as will become apparent hereinafter, are provided, each of which has seven positions to correspond, respectively, with the aforementioned switching positions, O, I to VI, of switch S. The respective contact arms of switches SI to SVI are connected, as illustrated by the broken line in the figure, to the arm of switch S and movement or rotation of the latter to any of the aforementioned switching positions causes the respective arms of each of the switches SI to SVI to be placed in the respective corresponding position associated therewith. For example, in the drawing, each of the respective arms of switches, S, SI to SVI, are illustrated as being in the "off" position O. For the sake of clarity in illustrating the respective contacts and connections thereto of switches SI to SVI, the respective arms of switches SI, SII, SIV and SVI are illustrated as being adapted to rotate in the same direction, for example, in a counterclockwise direction, as the arm of switch S; whereas, the respective arms of switches III and V are illustrated as being adapted to rotate in an opposite direction, which would be clockwise for the given example. The line voltage is connected to the terminals 6, whereas the battery to be charged is connected to the terminals 7. In order to derive direct voltages from the alternating line voltages, a relay W is connected in the output of a rectifier 8. By means of a plurality of resistors 9 to 14 switched into the circuit in the switching positions of a switch SI and of a rectifier 15, the comparison voltage for one winding 16 of the polarized relay P is obtained. The polarized relay P has, moreover, a winding 17 of opposite polarity to that of the winding 16, which is connected via the series resistor 18 to the battery voltage operative at the terminals 7. The rectifier 15 ensures a polarity independent of that of the line voltage.

If the two currents of opposite polarities passing through the relay windings 16 and 17 of equal size are of the same values and which would be the situation when selector switch S is set to a switching position which corresponds to the value and type of line voltage impressed on terminals 6, the relay P, which is adjusted to the central rest position, does not establish a contact $p$. Thus, at the transistor 19 a voltage is produced between the base 20 and the emitter 21 and a collector current flows, which is sufficient to cause a relay A, included in the collector circuit, to be energized. By the closure of the contacts $a_1$ and $a_2$ of the relay A, the line voltage is applied to the transformer 2, either directly as in the case of an A.C. line voltage, or indirectly as in the case of a D.C. line voltage converted to an A.C. voltage by the vibrator 1, as will be explained hereinafter, which means that the circuit arrangement is switched on and the connection between the charging rectifier 3 and the terminals 7 is established. It is obvious, however, that if the selector switch, i.e. control-switch S is not set to a switching position which corresponds to the value and type of the line voltage present at the terminals 6, because, for example, by accident or lack of knowelge of these characteristics of the line voltage, the currents passing through the relay windings 16 and 17 would not be equal, thereby, causing the armature of relay P to close the contacts at P and short circuit base 20 and emitter 21. As a result, no energizing current will be in the winding of relay A sufficient to close contacts $A_1$ or $A_2$, in which event the line voltage, either directly as in the case of an A.C. line voltage, or indirectly as in the case of a converted D.C. line voltage, is not coupled to transformer 2 and no connection between the charging rectifier 3 and terminals 7 is established. In this manner, the charging operation automatically takes place only when the correct value and type of line voltage is applied to terminals 6 and 7.

With alternating voltage applied to the terminals 6 and the arm of switch S in an A.C. position such as, for example, 220 A.C. volts, the capacitor 22 constitutes a series resistor for the rectifier 8 and the relay W. A voltage-dependent resistor 23 protects the relay W, since said relay must operate both with 110 and with 220 v. When the relay W is energized, the armature of relay W moves into the alternate position of that shown in the drawing closing contact $W_1$ and, thus, the line voltage is connected directly to the appropriate switching position of switch SV, which has suitable contacts for coupling to the transformer 2. In addition, the movement of the armature of relay W from the position illustrated also causes the contact $W_2$ to be closed and the line voltage for the polarized relay P to be connected to the series resistors 9 and 10 respectively, which are intended for 220 A.C. and 110 A.C. respectively, the selection of the appropriate resistor 9 or 10 being effectuated by the coaction of switches S and SI.

In the case of direct current voltage, no current can flow through the capacitor 22. The contacts $w_1$ and $w_2$ of the relay W thus remain in the positions illustrated in the figure and connect the line direct voltage to the vibrator contact 24 and to the series resistors 11 to 14, adapted to line direct voltages of 220, 110, 65 and 24 volts. Thus, in the case of direct line voltage a comparison voltage is available for the winding 16 of the relay P, the switches S and SI, again effectuating the appropriate one of the resistors 11–14. As aforementioned, the driving coils 4 and 5 of the vibrator 1 may be connected in series or parallel. In the embodiment chosen to illustrate the principles of this invention, the switches SIII and SIV are illustrated as being capable of effectuating a series connection of the coils 4 and 5 for 220, 110, and 65 D.C. volt operation and a parallel connection for 24 D.C. volt operation. In addition, switch SII effectuates the connection of different current limiting resistors into the windings 4 and 5 to limit further undesired heating and overloading effects. Switches SV and SVI couple the A.C. output of vibrator 1 to the appropriate input contacts of transformer 2.

The operation of vibrator 1 is well known to those skilled in the art; see, for example, McGraw-Hill Encyclopedia of Science and Technology, vol. 14, pp. 321 et seq. Briefly, vibrator 1 comprises a flat reed carrying a soft iron-slug or armature adapted to be attracted by the magnetic field created by the energized driving coils 4, 5. Each contact of a pair of main contacts is connected to the respective arms of switches SV and SVI for couling the A.C. output thereto as aforementioned. The driving coil is associated with a driving coil contact which in the rest position of the vibrator is in contact with the reed. When a D.C. voltage is impressed at terminal 6, and the arms of switches S, SI to SII are positioned for D.C. operation, a D.C. voltage is impressed across the driving coil, causing the armature to be attracted and the reed to make contact with one of the main contacts. At the same time, the coil contact is opened and the driving coil is de-energized. The reed then moves back closing the coil contact, and repeating the cycle. The reed vibrations build up until equilibrium is reached at which time the reed oscillates vigorously between each of the main contacts, with each of the main contacts being closed for nearly half of the vibration period and thereby producing an alternating current voltage output.

The capacitor 25 and the choke 26 serve to filter the charging current. The resistors 27 and 28 serve to increase the transformer resistance with a low-ohmic 24 v. winding.

In order to indicate the capability of operation provision may be made of a glow-discharge-lamp 29, which ignites at the instant when the relay contact $a_1$ is closed. This means that the buffer charging circuit arrangement is capable of operating for the line voltage concerned.

What is claimed is:

1. A circuit arrangement comprising a storage cell, input means for a source of line voltage having one of a plurality of values of alternating and direct voltage, a transformer having a multiple voltage primary winding section and a secondary winding section, a charging rectifier interposed between said secondary winding section and said storage cell, means for converting a direct voltage into an alternating voltage, means for deriving from said line voltage source a reference electrical quantity of substantially the same given value for different values of said source, means for deriving a second electrical quantity as determined by the voltage of said storage cell, means responsive to the difference between said quantities for connecting said input means to said primary winding section and for connecting said storage cell to said rectifier, and means responsive to said input voltage for selectively interposing said convertor means between said input means and said multiple voltage winding.

2. A circuit arrangement comprising a storage cell, input means for a source of line voltage having one of a plurality of values of alternating and direct voltage, a transformer having a multiple voltage primary winding section and a secondary winding section, a charging rectifier interposed between said secondary winding section and said storage cell, means for converting a direct voltage into an alternating voltage, first switching means for deriving from said line voltage source a reference electrical quantity of substantially the same given value for different values of said source, means for deriving a second electrical quantity as determined by the voltage of said storage cell, means responsive to the difference between said quantities for connecting said input means to said primary winding section and for connecting said storage cell to said rectifier, means responsive to said input voltage for selectively interposing said convertor means between said input means and said multiple voltage winding, second switching means for said primary winding section, and means for the common actuation of said first and second switching means.

3. A circuit arrangement comprising a storage cell, input means for a source of line voltage having one of a plurality of values of alternating and direct voltage, a transformer having a multiple voltage primary winding section and a secondary winding section, a charging rectifier interposed between said secondary winding section and said storage cell, means for converting a direct voltage into an alternating voltage, means for deriving from said line voltage source a reference electrical quantity of substantially the same given value for different voltages of said source comprising a plurality of impedances and switching means for selectively connecting said impedances to said input means, a bridge rectifier system interposed between said impedances and said input means for establishing a given polarity to said reference quantity, means for deriving a second electrical quantity as determined by the voltage of said storage cell, relay means having first and second windings and comprising an armature having a central rest position intermediate to two contact positions, means connected to said contacts and at the said central rest position connecting said input means to said transformer and connecting said storage cell to said rectifier, means for applying said quantities to respective ones of said relay windings, and means responsive to said input voltage for selectively interposing said convertor means between said input means and said multiple voltage winding.

References Cited in the file of this patent

UNITED STATES PATENTS

| | | |
|---|---|---|
| 2,873,407 | Most | Feb. 10, 1959 |
| 2,877,385 | Rock | Mar. 10, 1959 |
| 2,885,623 | Staufenberg | May 5, 1959 |